(12) United States Patent
Scholl et al.

(10) Patent No.: US 12,131,138 B2
(45) Date of Patent: Oct. 29, 2024

(54) PROGRAMMABLE ELECTRONIC TEST EQUIPMENT AND METHOD FOR PROGRAMMING ELECTRONIC TEST EQUIPMENT

(71) Applicant: Rohde & Schwarz GmbH & Co. KG, Munich (DE)

(72) Inventors: Simon Scholl, Augsburg (DE); Thomas Maierbacher, Rosenheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 146 days.

(21) Appl. No.: 18/077,510

(22) Filed: Dec. 8, 2022

(65) Prior Publication Data

US 2024/0192933 A1    Jun. 13, 2024

(51) Int. Cl.
*G06F 8/41*       (2018.01)
*G06F 3/04847*    (2022.01)
*G06F 8/30*       (2018.01)
*G06F 9/455*      (2018.01)

(52) U.S. Cl.
CPC ............ *G06F 8/41* (2013.01); *G06F 3/04847* (2013.01); *G06F 8/311* (2013.01); *G06F 9/45533* (2013.01)

(58) Field of Classification Search
CPC ........ G06F 8/41; G06F 3/04847; G06F 8/311; G06F 9/45533
See application file for complete search history.

(56) References Cited

U.S. PATENT DOCUMENTS

| | | | | |
|---|---|---|---|---|
| 6,237,135 | B1 * | 5/2001 | Timbol | G06F 8/34 717/118 |
| 6,807,548 | B1 * | 10/2004 | Kemper | G06F 8/72 |
| 2010/0333072 | A1 * | 12/2010 | Dulip | G06F 11/3419 707/769 |

(Continued)

FOREIGN PATENT DOCUMENTS

| | | | | | |
|---|---|---|---|---|---|
| CN | 102789415 | A | * | 11/2012 | .......... G06F 11/3664 |
| CN | 111209207 | A | * | 5/2020 | .......... G06F 11/3684 |

OTHER PUBLICATIONS

Tektronix, "Getting Started with Oscilloscope Automation and Python App", Technical Brief, Feb. 2018, 9 pages.

(Continued)

*Primary Examiner* — Phillip H Nguyen
(74) *Attorney, Agent, or Firm* — Westman, Champlin & Koehler, P.A.

(57) ABSTRACT

Flexibly programmable electronic test equipment and methods for programming same are disclosed. A piece of electronic test equipment includes signal processing hardware, a signal processor coupled to the signal processing hardware to control operation of the signal processing hardware, a central processor coupled to the signal processor, a graphical user interface, a graphics processor configured to control operations of the graphical user interface, a script language interpreter including a compiler and a virtual machine, the compiler converts script source code to byte code fed to the virtual machine interprets the byte code into machine code at run-time for controlling at least one of the signal processor and the graphics processor, the graphical user interface receives editable input parameters from a user to the script source code being converted by the compiler of the script language interpreter.

16 Claims, 1 Drawing Sheet

(56) References Cited

U.S. PATENT DOCUMENTS

2018/0373620 A1\* 12/2018 Thomson ............ G06F 11/3696
2022/0066915 A1\* 3/2022 Holt ................... G06F 11/3664

OTHER PUBLICATIONS

Zes Zimmer, "LMG611—Precision Power Analyzer with Dual Path", Jun. 2021, 16 pages.
Smith, Craig, "The Car Hacker's Handbook: a Guide for the Penetration Tester", chapter 8, No Starch Press 2016, 306 pages.
"PyArbTools", Search Project, Retrieved from https://web.archive.org/web/20210430202438/https://pypi.org/project/pyarbtools/, Released Feb. 26, 2021, 6 pages.
"RsSmw 4.90.49.53", Search Project, Retrieved from https://web.archive.org/web/20220124105331/https://pypi.org/project/RsSmw/, Released Nov. 15, 2021, 2 pages.
"LMG600 device family—Precision power meters with 1 to 7 channels"—Zes Zimmer User Manual, Feb. 2, 2016 V0.0 R33328, 580 pages.

\* cited by examiner

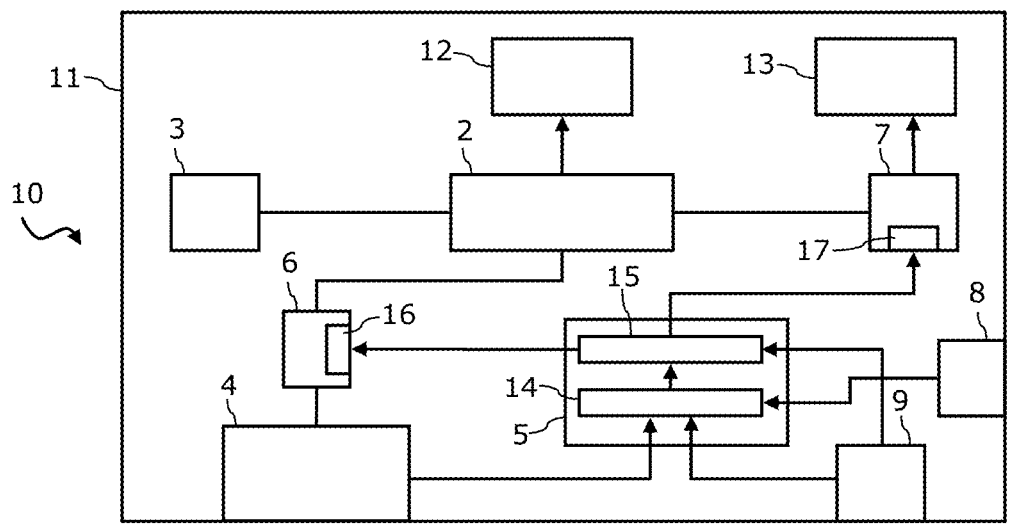
Fig. 1
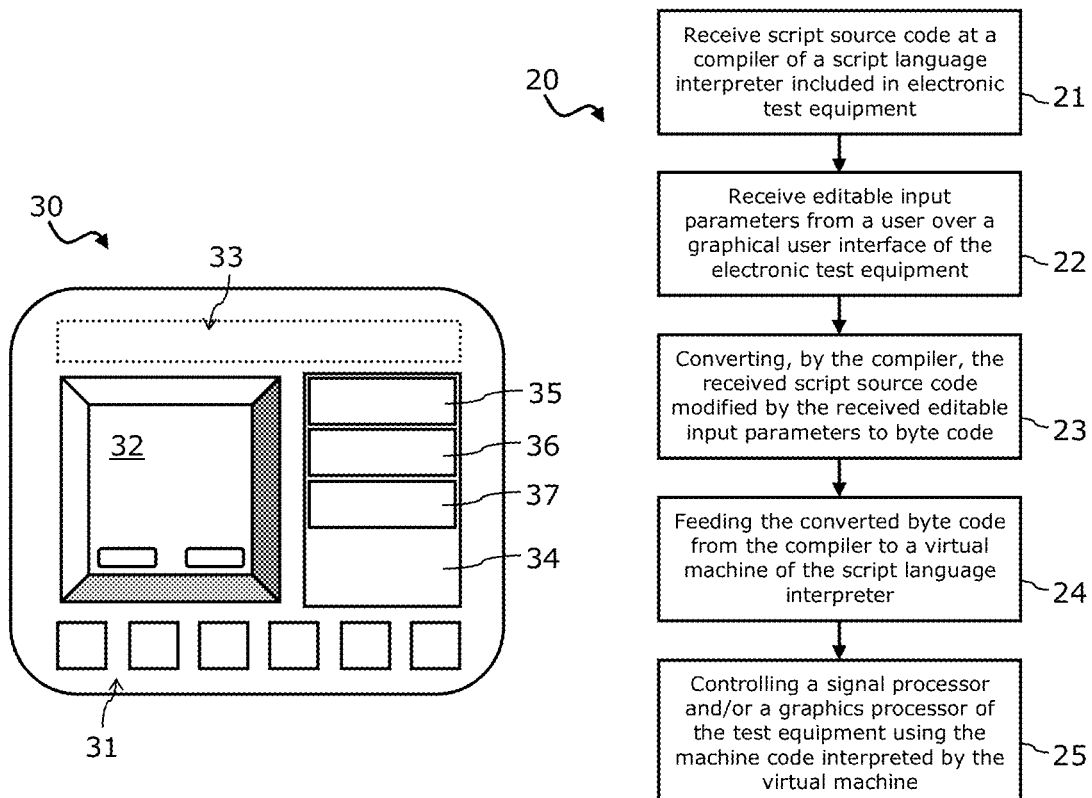
Fig. 3
Fig. 2

PROGRAMMABLE ELECTRONIC TEST EQUIPMENT AND METHOD FOR PROGRAMMING ELECTRONIC TEST EQUIPMENT

FIELD OF THE INVENTION

The present invention relates to flexibly programmable electronic test equipment, such as signal generators, digital pattern generators, pulse generators, oscilloscopes, frequency counters or network analysers, and to methods for flexibly programming such electronic test equipment. Such methods and systems may in particular employ script language interpreters built-in in the electronic test equipment.

BACKGROUND OF THE INVENTION

Software solutions for the contemporary signal generators support various demanding applications, including radar signal simulation, generation of digital I/Q signals supporting various radio standards, easy generation of digitally modulated signals on a PC, multi-channel vector analyser setups with calibrated amplitude, time and phase as well as software tailored for multi-channel vector signal generator setups, according to many standards and over a wide range of applications. In order to adapt the signal generator software to unique test and measurement needs external configuration tools such as PCs or static configuration logic in firmware applications.

For example, Smith, Craig: "The Car Hacker's Handbook: A Guide for the Penetration Tester", chapter 8, No Starch Press 2016 discloses an open source configurable side-channel analysis for pen-testing embedded systems. PyArbTools (https://web.archive.org/web/20210430202438/https://pypi.org/project/pyarbtools/) and RsSmw (https://web.archive.org/web/20220124105331/https://pypi.org/project/RsSmw/) each disclose collections of Python classes, library modules and functions providing signal creation, instrument configuration, and waveform download capabilities for signal generators.

SUMMARY OF THE INVENTION

According to the disclosure of the present invention flexibly programmable electronic test equipment and methods for flexibly programming electronic test equipment may be implemented.

Specifically, according to a first aspect of the invention, an electronic test equipment includes signal processing hardware, a signal processor coupled to the signal processing hardware and configured to control the operation of the signal processing hardware, a central processor coupled to the signal processor, a graphical user interface, a graphics processor coupled to the central processor and the graphical user interface, the graphics processor configured to control operations of the graphical user interface, a script language interpreter including a compiler and a virtual machine, the script language interpreter coupled to the graphical user interface and the graphics processor, the compiler configured to convert script source code to byte code fed to the virtual machine which is configured to interpret the byte code into machine code at run-time for controlling at least one of the signal processor and the graphics processor, the graphical user interface being configured to receive editable input parameters from a user to the script source code being converted by the compiler of the script language interpreter.

According to a second aspect of the invention, a method for operating electronic test equipment comprises the steps of receiving a script source code at a compiler of a script language interpreter included in the electronic test equipment; receiving editable input parameters from a user over a graphical user interface of the electronic test equipment; converting, by the compiler, the received script source code modified by the received editable input parameters to byte code; feeding the converted byte code from the compiler to a virtual machine of the script language interpreter, the virtual machine interpreting the converted byte code into machine code at run-time; and controlling at least one of a signal processor and a graphics processor of the electronic test equipment using the machine code interpreted by the virtual machine of the script language interpreter, the graphics processor being configured to control operations of the graphical user interface and the signal processor being configured to control operations of signal processing hardware of the electronic test equipment.

One idea of the present invention is to equip electronic test equipment with scripting capabilities that enable the user of the test equipment to influence the functionality of the test equipment without need to know the firmware or the machine code of the test equipment.

Amongst others, there are several specific advantages associated with such flexibly programmable electronic test equipment and methods for flexibly programming electronic test equipment. By using electronic test equipment including script interpreters which may be fed with application-specific programmable scripts, the need for external configuration equipment such as PCs may be obviated. Moreover, the graphical user interface of the electronic test equipment may allow for easy and intuitive adjustment of the scripts. The graphical user interface may in particular be adapted specifically to the user of the electronic test equipment so that complex logic may be used to simplify the configuration process of the electronic test equipment. Users of the electronic test equipment may use the scripting capability of the test equipment to adapt complex behaviour of components of the equipment during run-time and does not have to rely on static firmware configuration.

Using commonly known scripting language such as for example Python, knowledge about domain specific languages in the particular programming environment of the electronic test equipment is not necessary. Standard Commands for Programmable Instruments (SCPI) which form a layer in the IEEE-488.2 standard may be used as command line interpreter strings that are sent via the physical communication layer to internal components of the electronic test equipment for setting operations, query operations and/or polling operations.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

FIG. 1 schematically illustrates a functional block diagram of electronic test equipment according to some embodiments of the invention.

FIG. 2 shows a flowchart of procedural stages of a method for programming electronic test equipment according to some further embodiments of the invention.

FIG. 3 shows an exemplary graphical user interface of a piece of electronic test equipment according to some further embodiments of the invention.

In all figures of the drawings elements, features and components which are the same or at least have the same functionality have been provided with the same reference symbols, unless explicitly stated otherwise.

DETAILED DESCRIPTION OF THE EMBODIMENTS

Electronic test equipment within the meaning of the present invention include any electronic equipment capable of creating signals and/or capturing responses from electronic devices under test (DUTs). Electronic test equipment may in particular be employed to test proper operation of a number of DUTs coupled to the test equipment and to trace faults in the DUTs.

FIG. 1 schematically illustrates a piece of electronic test equipment 10. The electronic test equipment 10 may in particular be a signal generator, a digital pattern generator, a pulse generator, an oscilloscope, a frequency counter or a network analyser. The electronic test equipment 10 may generally include a housing 11 in which all components of the electronic test equipment 10 are housed or installed. The electronic test equipment 10 may in particular be a stand-alone device which does not necessarily need an external configuration tool such as a PC or another electronic device for configuration.

The electronic test equipment 10 includes a central processor 2, signal processing hardware 13, a signal processor 7 coupled to the signal processing hardware 13 and the central processor 2 and configured to control the operation of the signal processing hardware 13, a graphical user interface 4, and a graphics processor 6 coupled to the central processor 2 and the graphical user interface 4. The graphics processor 6 is used to control operations of the graphical user interface 4.

A possible implementation of the graphical user interface 4 is exemplarily shown in FIG. 3. A display 30 of the graphical user interface 4 may include a number of graphical display elements 31 to 37 which may be used to visually indicate operational conditions, measurement values, equipment settings and/or other information to a user. For example, the display 30 may show a status bar 31 with status elements, a visual representation 32 of measurement values, and an action menu 33. The display 30 may also include a list 34 specifically used for indicating script language elements, such as for example stored scripts 35, currently active scripts 36 and/or fields 37 for editable input parameters to be edited by interaction of a user with the electronic test equipment 10.

The electronic test equipment 10 further includes a script language interpreter 5 including a compiler 14 and a virtual machine 15. The script language interpreter 5 is coupled to the graphical user interface 4 for receiving editable input parameters from a user. The script language interpreter 5 is further coupled to the graphics processor 6 and the signal processor 7.

The compiler 14 converts script source code to byte code which is then fed to the virtual machine 15. The virtual machine 15 interprets the byte code into machine code at run-time for controlling at least one of the signal processor 7 and the graphics processor 6. The compiler 14 uses the editable input parameters from a user as modifications to the script source code.

The graphics processor 6 may comprise a virtual machine socket 16 coupled to the virtual machine 15 of the script language interpreter 5. Similarly, the signal processor 7 may comprise a virtual machine socket 17 coupled to the virtual machine 15 of the script language interpreter 5. An input/output interface 9 may be included in the electronic test equipment 10, for example a USB port, that couples to the compiler 14 of the script language interpreter 5 and may be used to feed external script source code to the compiler 14 for converting into byte code. Moreover, the input/output interface 9 may also be used to feed external script libraries modules to the virtual machine 15 of the script language interpreter 5. Script libraries modules are files that may be imported into script source code and may contain helpful functions, classes, or variables pointing to useful data in the respective script language.

The electronic test equipment 10 may further comprise a sensor module 8 coupled to the compiler 14 of the script language interpreter 5. Such a sensor module 8 may be used to measure environmental sensor values and feed the measured sensor values to the compiler 14 as editable input parameters to either the user input script source code or the external script source code.

Furthermore, the electronic test equipment 10 may further comprise a configuration storage module 3 coupled to the central processor and configured to store firmware for operation of the central processor 2. Additionally, the electronic test equipment 10 may further comprise auxiliary signal processing hardware 12 directly coupled to the central processor 2. Such auxiliary signal processing hardware 12 may be hardware that should not be influenced by scripts input by a user, for example critical hardware that is fixedly encoded in the electronic test equipment 10.

The script source code converted by the compiler 14 of the script language interpreter 5 is, for example, Python source code. However, other script languages designed to manipulate, customize, and automate components of the electronic test equipment 10 and interpreted at run-time, such as for example JavaScript, Bash, Perl, Tcl, Kotlin, Lua, Lisp or Visual Basic may also be employed. The script language interpreter 5 is then designed to be a direct instruction executer that parses the respective source code type, translates it into byte code and interprets the translated byte code for immediate execution in a virtual machine. The script language interpreter 5 may also be designed to execute stored or externally received precompiled bytecode, for example in script libraries modules.

FIG. 2 schematically illustrates procedural stages of a method 20 for programming electronic test equipment, particularly electronic test equipment 10 as shown and explained in conjunction with FIGS. 1 and 3. The electronic test equipment to be programmed by the method 20 may be a signal generator, a digital pattern generator, a pulse generator, an oscilloscope, a frequency counter or a network analyser. The method 20 may be used for improving the flexibility of radar signal simulation, generation of digital I/Q signals supporting various radio standards, generation of digitally modulated signals on a PC and/or setting up multi-channel vector analyser or generator setups with calibrated amplitude, time and phase.

In the method 20, a first step 21 includes receiving a script source code at a compiler 14 of a script language interpreter 5 included in the electronic test equipment 10, for example Python source code. However, other script languages designed to manipulate, customize, and automate components of the electronic test equipment 10 and interpreted at run-time, such as for example JavaScript, Bash, Perl, Tcl, Kotlin, Lua, Lisp or Visual Basic may also be employed. The script language interpreter 5 is then designed to be a direct instruction executer that parses the respective source code type, translates it into byte code and interprets the translated byte code for immediate execution in a virtual machine. The script language interpreter 5 may also be designed to execute stored or externally received precompiled bytecode, for example in script libraries modules.

In a second step 22, editable input parameters from a user are received over a graphical user interface 4 of the electronic test equipment 10. In a third step, 23, the compiler 14 converts the received script source code modified by the received editable input parameters to byte code. The converted byte code from the compiler 14 is fed in a fourth step 24 to a virtual machine 15 of the script language interpreter 5. The virtual machine 15 interprets the converted byte code into machine code at run-time.

The machine code interpreted by the virtual machine 15 of the script language interpreter 5 is then used in a fifth step 25 to control at least one of a signal processor 7 and a graphics processor 6 of the electronic test equipment 10. For example, the signal processor 7 and the graphics processor 6 may include virtual machine sockets 16 and 17, respectively, for the virtual machine 15 to connect to, the virtual machine sockets being capable of facilitating operative control to the virtual machine 15 via the machine code generated from the script source code fed to the script language interpreter 5.

The graphics processor 6 controls operations of the graphical user interface 4 and the signal processor 7 controls operations of signal processing hardware 13 of the electronic test equipment 10. By allowing the virtual machine 15 of the script language interpreter 5 to at least partially alter functionality of the graphics processor 6 and/or the signal processor 7, a user is given the opportunity to flexibly program the graphics processor 6 and/or the signal processor 7 via a script language without the need to know the machine code running the graphics processor 6 and/or the signal processor 7.

In some implementations, external script source code may be additionally fed to the compiler 14 of the script language interpreter 5 via an input/output interface 9 included in the electronic test equipment 10. This input/output interface 9 may also be used to feed external script libraries modules to the virtual machine 15 of the script language interpreter 5. Script libraries modules are files that may be imported into script source code and may contain helpful functions, classes, or variables pointing to useful data in the respective script language.

In some implementations, a sensor module 8 included in the electronic test equipment 10 may be used to measure environmental sensor values and feed the measured sensor values to the compiler 14 of the script language interpreter 5 as (further) editable input parameters to the script source code.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatuses implementing the present invention are, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried out, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A piece of electronic test equipment, comprising:
signal processing hardware;
a signal processor coupled to the signal processing hardware and configured to control the operation of the signal processing hardware;
a central processor coupled to the signal processor;
a graphical user interface;
a graphics processor coupled to the central processor and the graphical user interface, the graphics processor configured to control operations of the graphical user interface;
a script language interpreter including a compiler and a virtual machine, the script language interpreter coupled to the graphical user interface and the graphics processor, the compiler configured to convert script source code to byte code fed to the virtual machine which is configured to interpret the byte code into machine code at run-time for controlling at least one of the signal processor and the graphics processor,
the graphical user interface being configured to receive editable input parameters from a user to the script source code being converted by the compiler of the script language interpreter.

2. The piece of electronic test equipment of claim 1, wherein the graphics processor comprises a virtual machine socket coupled to the virtual machine of the script language interpreter.

3. The piece of electronic test equipment of claim 1, wherein the signal processor comprises a virtual machine socket coupled to the virtual machine of the script language interpreter.

4. The piece of electronic test equipment of claim 1, further comprising an input/output interface coupled to the compiler of the script language interpreter, the input/output interface configured to feed external script source code to the compiler of the script language interpreter.

5. The piece of electronic test equipment of claim 4, wherein the input/output interface is further coupled to the virtual machine of the script language interpreter, the input/output interface configured to feed external script libraries modules to the virtual machine of the script language interpreter.

6. The piece of electronic test equipment of claim 1, further comprising a sensor module coupled to the compiler of the script language interpreter, the sensor module configured to measure environmental sensor values and to feed the measured sensor values to the compiler of the script language interpreter as editable input parameters to the script source code.

7. The piece of electronic test equipment of claim 1, further comprising a configuration storage module coupled to the central processor and configured to store firmware for operation of the central processor.

8. The piece of electronic test equipment of claim 1, further comprising auxiliary signal processing hardware directly coupled to the central processor.

9. The piece of electronic test equipment of claim 1, wherein the piece of electronic test equipment is one of a signal generator, a digital pattern generator, a pulse generator, an oscilloscope, a frequency counter and a network analyser.

10. The piece of electronic test equipment of claim 1, wherein the script language interpreter is a Python interpreter and wherein the script source code is Python source code.

11. A method for programming electronic test equipment, the method comprising:
receiving a script source code at a compiler of a script language interpreter included in the electronic test equipment;
receiving editable input parameters from a user over a graphical user interface of the electronic test equipment;
converting, by the compiler, the received script source code modified by the received editable input parameters to byte code;
feeding the converted byte code from the compiler to a virtual machine of the script language interpreter, the virtual machine interpreting the converted byte code into machine code at run-time; and
controlling at least one of a signal processor and a graphics processor of the electronic test equipment using the machine code interpreted by the virtual machine of the script language interpreter, the graphics processor being configured to control operations of the graphical user interface and the signal processor being configured to control operations of signal processing hardware of the electronic test equipment.

12. The method of claim 11, further comprising feeding external script source code to the compiler of the script language interpreter via an input/output interface included in the electronic test equipment.

13. The method of claim 12, further comprising feeding external script libraries modules to the virtual machine of the script language interpreter via the input/output interface.

14. The method of claim 11, further comprising measuring environmental sensor values using a sensor module included in the electronic test equipment and feeding the measured sensor values to the compiler of the script language interpreter as editable input parameters to the script source code.

15. The method of claim 11, wherein the electronic test equipment is one of a signal generator, a digital pattern generator, a pulse generator, an oscilloscope, a frequency counter and a network analyser.

16. The method of claim 11, wherein the script language interpreter is a Python interpreter and wherein the script source code is Python source code.

* * * * *